(12) United States Patent
Quioc et al.

(10) Patent No.: US 8,608,196 B2
(45) Date of Patent: Dec. 17, 2013

(54) GAS GENERATING SYSTEM

(75) Inventors: Eduardo L. Quioc, Westland, MI (US); David S. Whang, Bloomfield Hills, MI (US); Shoichi Sawa, Shiga (JP)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 11/168,267

(22) Filed: Jun. 28, 2005

(65) Prior Publication Data

US 2006/0016362 A1 Jan. 26, 2006

Related U.S. Application Data

(60) Provisional application No. 60/583,954, filed on Jun. 29, 2004, provisional application No. 60/583,936, filed on Jun. 29, 2004.

(51) Int. Cl.
*B60R 21/26* (2011.01)
(52) U.S. Cl.
USPC ............................. 280/736; 280/740; 280/741
(58) Field of Classification Search
USPC .................. 280/740, 741, 742, 736; 55/385.3
See application file for complete search history.

(56) References Cited

U.S. PATENT DOCUMENTS

| | | | | |
|---|---|---|---|---|
| 3,342,563 A | * | 9/1967 | Butts | 75/246 |
| 3,364,951 A | * | 1/1968 | Burne et al. | 138/38 |
| 3,751,271 A | * | 8/1973 | Kimura et al. | 501/85 |
| 3,981,352 A | * | 9/1976 | Nurminen et al. | 164/358 |
| 3,984,044 A | * | 10/1976 | Breton et al. | 228/198 |
| 4,316,874 A | | 2/1982 | Kasama et al. | 422/741 |
| 5,019,311 A | * | 5/1991 | Koslow | 264/122 |
| 5,098,571 A | | 3/1992 | Maebashi | 210/500.23 |
| 5,100,171 A | * | 3/1992 | Faigle et al. | 280/736 |
| 5,390,954 A | * | 2/1995 | Faigle et al. | 280/736 |
| 5,547,638 A | | 8/1996 | Rink et al. | 422/164 |
| 5,738,373 A | | 4/1998 | Siddiqui | 280/740 |

(Continued)

OTHER PUBLICATIONS

Robert L. Harmon, Harmon on Patents: Black-Letter Law and Commentary: Part II: Patent Infringement; Chapter 3: Patent Claims and Their Construction, Sections 3.1-3.2, Chicago (Jul. 2007).*

*Primary Examiner* — Joseph Rocca
*Assistant Examiner* — Timothy Wilhelm
(74) *Attorney, Agent, or Firm* — L.C. Begin & Associates, PLLC (57) ABSTRACT

A gas generating system (10) including a filter assembly (36) formed from a plurality of nodules (36b) positioned and secured in relation to each other so as to form a porous structure (36a). In one embodiment, the nodules (36b) are metallic and are secured in relation to each other using either a sintering process or a brazing process. The nodules (36b) may be bonded directly together, or the nodules may be secured within a metallic matrix material. The gas generating system may also include a first baffle plate (40) positioned between the plurality of nodules (36b) and a gas source of the gas generating system (10), and a second baffle plate (42) positioned between the plurality of nodules (36b) and a housing wall (12c) of the gas generating system (10). The baffle plates (40, 42) provide added structural integrity to the porous structure (36a) and increase the length of a tortuous flow path of gases through the filter assembly (36). Apertures (40a, 42a) and are provided in the baffle plates (40, 42) to aid in directing the flow of gases through the porous structure (36b), thereby ensuring a tortuous flow path for the gases. A vehicle occupant protection system (480) incorporating the filter assembly (36) is also described.

6 Claims, 6 Drawing Sheets

(56) References Cited

U.S. PATENT DOCUMENTS

| | | | |
|---|---|---|---|
| 5,746,793 A | 5/1998 | Rink et al. | 55/385.3 |
| 5,759,219 A | 6/1998 | Rink et al. | 55/385.3 |
| 6,117,592 A * | 9/2000 | Hoshino et al. | 429/235 |
| 6,142,515 A * | 11/2000 | Mika | 280/736 |
| 6,412,816 B1 * | 7/2002 | Gast et al. | 280/736 |
| 6,423,422 B2 * | 7/2002 | Wada et al. | 428/550 |
| 6,454,299 B2 * | 9/2002 | Whang et al. | 280/736 |
| 6,464,254 B2 * | 10/2002 | Chikaraishi et al. | 280/741 |
| 6,576,032 B2 * | 6/2003 | Maus | 55/446 |
| 6,852,272 B2 * | 2/2005 | Artz et al. | 419/2 |
| 6,964,817 B2 * | 11/2005 | Date et al. | 428/613 |
| 2003/0127840 A1 * | 7/2003 | Nakashima et al. | 280/741 |
| 2004/0072010 A1 * | 4/2004 | Date et al. | 428/566 |
| 2005/0161923 A1 * | 7/2005 | Hirooka et al. | 280/741 |

* cited by examiner

GAS GENERATING SYSTEM

CROSS-REFERENCE TO RELATED APPLICATIONS

This application claims the benefit of provisional application Ser. Nos. 60/583,936 and 60/583,954, both filed on Jun. 29, 2004.

BACKGROUND OF THE INVENTION

The present invention relates generally to gas generating systems and, more particularly, to gas generating systems for use in applications such as inflatable occupant restraint systems in motor vehicles.

Installation of inflatable occupant protection systems, generally including airbag systems as standard equipment in all new vehicles has intensified the search for smaller, lighter and less expensive protection systems. Accordingly, since the inflation gas generator used in such protection systems tends to be the heaviest and most expensive component, there is a need for a lighter and less expensive gas generating system.

A typical gas generating system includes cylindrical steel or aluminum housing having a diameter and length related to the vehicle application and characteristics of a gas generant composition contained therein. Inhalation by a vehicle occupant of particulates generated by gas generant combustion during airbag activation can be hazardous. Thus, the gas generating system is generally provided with an internal or external filter comprising one or more layers of steel screen of varying mesh and wire diameter. Gas produced upon combustion of the gas generant passes through the filter before exiting the gas generating system. Particulate material, or slag, produced during combustion of the gas generant in a conventional system is substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into an associated airbag. However, inclusion of the filter in the gas generating system increases the complexity, expense, and especially the weight of the gas generating system.

SUMMARY OF THE INVENTION

The present invention includes a gas generating system including a filter assembly formed from a plurality of nodules positioned and secured in relation to each other so as to form a porous structure. In one embodiment, the nodules are metallic and are secured in relation to each other using either a sintering process or a brazing process. The nodules may be bonded directly together, or the nodules may be secured within a metallic matrix material. The gas generating system may also include a first baffle plate positioned between the plurality of nodules and a gas source of the gas generating system, and a second baffle plate positioned between the plurality of nodules and a housing wall of the gas generating system. The baffle plates provide added structural integrity to the porous structure and increase the length of a tortuous flow path of gases through the filter assembly. Apertures and are provided in the baffle plates to aid in directing the flow of gases through the porous structure, thereby ensuring a tortuous flow path for the gases. A vehicle occupant protection system incorporating the filter assembly is also disclosed.

DETAILED DESCRIPTION

Figure 1:
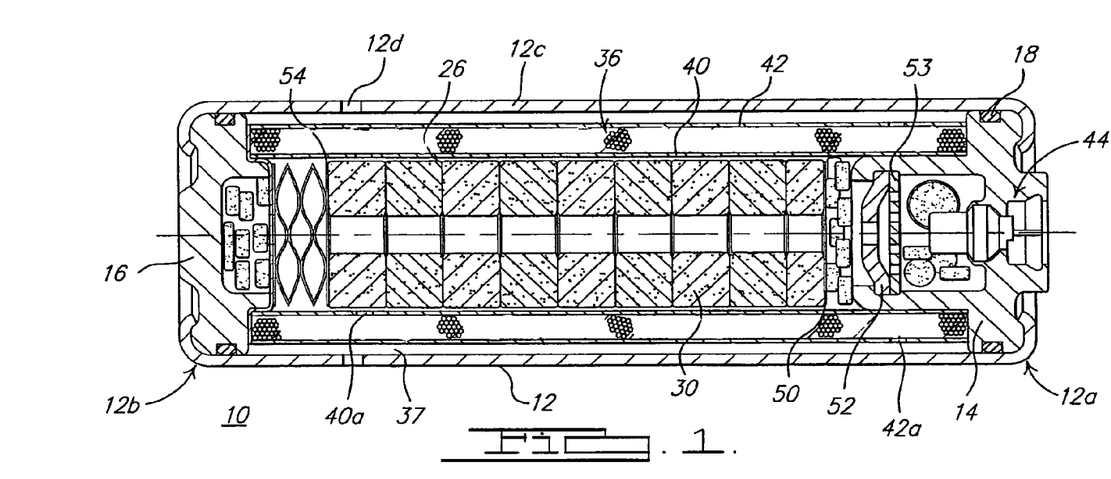
FIG. 1 exemplifies an inflator in accordance with the present invention.

FIG. 1 shows one embodiment of a gas generating system 10 in accordance with the present invention. Gas generating system 10 includes a substantially cylindrical housing 12 having a pair of opposed ends 12a, 12b and a wall 12c extending between the ends to define a housing interior cavity. Housing 12 is made from a metal or metal alloy and may be a cast, drawn, extruded, or otherwise metal-formed. A first end closure 14 is secured to end 12a of housing 12, and a second end closure 16 is secured to an opposite end 12b of housing 12 using one or more known methods. In FIG. 1, ends 12a and 12b of housing 12 are crimped over portions of first and second end closures 14, 16 to secure the end closures in the housing. One or more openings 12d are provided in housing wall 12c to enable fluid communication between an interior of the housing and an exterior of the housing.

Figure 2:
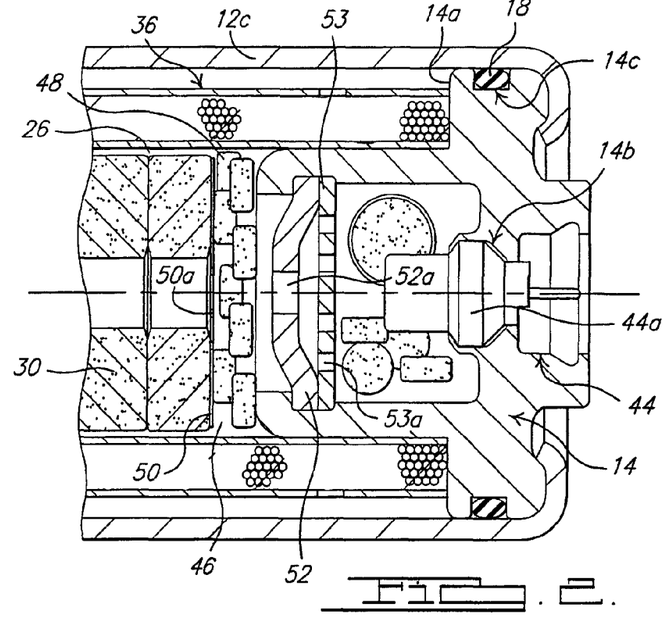
FIG. 2 is an exploded view of the first end closure of the inflator shown in FIG. 1.

Referring to FIGS. 1 and 2, first end closure 14 has formed therealong a peripheral shoulder 14a, a central orifice 14b, and a peripheral cavity 14c. Peripheral shoulder 14a is formed along a face of the end closure and is dimensioned so that an end portion of a filter assembly 36 (FIG. 4, described in greater detail below) having a predetermined inner diameter may be positioned along shoulder 14a to form an interference fit with end closure 14, thereby suspending the filter radially inward of housing wall 12c. An O-ring or seal 18 is positioned in peripheral cavity 14c to seal the interface between first end closure 14 and housing wall 12c. End closure 14 may be stamped, die cast, or otherwise metal formed and may be made from carbon steel or stainless steel, for example Referring to FIGS. 1 and 3, second end closure 16 has formed therealong a peripheral shoulder 16a, a central cavity 16b, and a peripheral cavity 16c. Peripheral shoulder 16a is formed along a face of the end closure and is dimensioned so that an end portion of a filter assembly 36 having a predetermined inner diameter may be positioned along the shoulder to form an interference fit with second end closure 16, thereby suspending the filter assembly radially inward of housing wall 12c. An O-ring or seal 20 is positioned in peripheral cavity 16c to seal the interface between second end closure 16 and housing wall 12c. End closure 16 may be stamped, die cast, or otherwise metal formed and may be made from carbon steel or stainless steel, for example.

A quantity of a known auto-ignition composition 28 is positioned within second end closure central cavity 16b. Auto-ignition composition 28 provides for safe ignition of main gas generant composition 30 (described in greater detail below) in the event of a fire or high heat incident.

Figure 4:
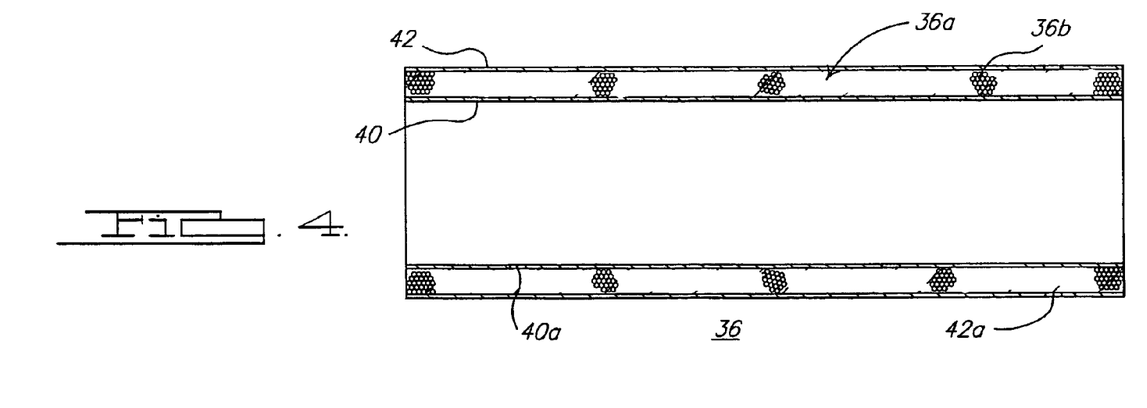
FIG. 4 exemplifies a filter in accordance with the present invention.

Referring to FIGS. 1 and 4, a filter assembly 36 is provided for cooling gases generated by combustion of gas generant 30 and for filtering particulates from the gases. In the embodiment shown in FIGS. 1 and 4, filter assembly 36 is in the form of a hollow cylinder positioned within housing 12 to define a combustion chamber 26 therein. Filter assembly 36 is interposed between gas generant 30 and apertures 12d formed along housing wall 12c to ensure that gases produced by combustion of gas generant 30 pass through the filter assembly prior to exiting the gas generator.

In general, filter assembly 36 is formed from a porous structure 36a comprising a plurality of nodules 36b positioned and secured in relation to each other so as to form a porous structure. Nodules 36b may be secured in relation to each other using either a brazing process or a sintering process as is known in the art. The nodules may be bonded together using a suitable brazing or sintering process, or the nodules may be encased within a matrix material using the brazing or sintering process. Where the nodules are encased in a matrix material, the matrix material preferably comprises a material that is an efficient conductor of heat, to facilitate cooling of the combustion products. In one embodiment, the nodules are encased in a metallic matrix material. As used herein, the term "metallic" refers to a substance or object which contains a metal.

The nodules may be metallic, or they may be formed from non-metallic materials. However, the nodules are preferably formed using a material that is an efficient conductor of heat. The nodules forming the porous structure may be hollow. Alternatively, the nodules forming the porous structure may comprise a solid core coated with a metallic material or other diffusible material. Materials suitable for forming the nodules and/or any matrix for encasing the nodules include, for example, various copper, iron, and aluminum alloys.

In addition, any material used to form the nodules and any matrix in which the nodules are encased should have a sufficiently high melt temperature to prevent softening and re-forming of the porous structure as a result of the flames and hot gases produced by combustion of gas generant 30, as this would impair the structural integrity and effectiveness of the filter assembly.

As is known in the art, brazing is the joining of metallic components through the use of heat and a filler metal whose melting temperature is above approximately 840° F. (450° C.) but below the melting point of the metals being joined. Brazing joins the metallic components by creating a metallurgical bond between the filler metal and the surfaces of the metals being joined. As used in the present invention, heat is applied to the overall assembly to heat the nodules to a temperature sufficient to melt the filler metal. The filler metal is then brought into contact with the heated nodules, whereupon it is melted by the heat of the nodules and drawn by capillary action into the interstices between the nodules.

As is known in the art, sintering involves the heating of a material to a temperature below the melting temperature but high enough to allow bonding or fusion of individual nodules. Nodules of defined shape and size are pre-formed and then diffusion bonded by the application of heat and/or pressure during the sintering process. During cooling, recrystallization of the material occurs to form an integrated network of pores whose size and distribution depends both on the sinter material and the sintering process.

In the embodiments described herein, the nodules used to form the porous filter structure are substantially spherical. Porous structures suitable for the applications described herein may be formed, for example, by sintering hollow or solid spheres of metal to produce a metallic foam, as known in the art. As a filter structure formed from hollow spheres does not contain a large proportion of solid metal, a lower filter weight can be obtained using hollow spheres than with structures made by sintering solid spheres.

One known process for producing spheres suitable for the applications described herein involves a coaxial double-nozzle mechanism in which a pulsating gas jet is fed through an inner nozzle. A slurry comprising dispersed solid particles (which can be metal, ceramic, or a mixture), a binder, a film stabilizing agent, a dispersing agent, and a continuous volatile liquid phase, is fed through an outer nozzle. Another nozzle periodically sprays liquid at the exit of the coaxial nozzle. This aids in the formation and detachment of gas bubbles enclosed by the slurry. A portion of the volatile liquid phase evaporates to leave a coated bubble in the shape of a sphere. The sphere is then exposed to an elevated temperature to remove the remaining liquid, leaving a metal sphere with substantially uniform diameter and skin thickness. A porous structure may be created for bonding such spheres together by applying a matrix formed from a slurry of a composition similar to that used to form the spheres. Alternatively, oxides on the metal-surfaces of the spheres can be reduced by sintering of the spheres, resulting in diffusion bonding of the spheres at their points of contact.

In another method, solid spheres formed from a base material (for example, polystyrene) are coated with a slurry as described above. Use of the base material to support the outer metallic layer makes the coated spheres less fragile than hollow metal spheres, enabling the coated spheres to be compressed together without fracturing prior to sintering. With this method, as the base material may be considerably lighter than the same volume of solid metal, a lower filter weight can be obtained than would otherwise be possible using solid metal spheres.

The diameters of the spheres formed by these methods can be controlled to a large degree, enabling regular packing of the spheres to form a stable structure, with a controllable, relatively homogeneous porosity and substantially uniform gas permeability across the volume of the filter. The porous structure formed by bonding the nodules together or by encasing the nodules in a connecting matrix provides an inherently tortuous flow path for gases through the interstices of the porous structure.

In addition, the nodules may be substantially uniformly distributed throughout the volume of the hollow cylinder, or the distribution of the nodules may vary along one or more dimensions of the filter, thereby effectively increasing the average spacing between the nodules and correspondingly increasing the average sizes of the pores through which the combustion products flow.

In the embodiment shown in FIGS. 1 and 4, the substantially spherical nodules have diameters ranging between 0.5 mm and 1.5 mm. However, the diameters of the spheres are not limited to this range. Metal spheres suitable for the purposes described herein may be obtained from Miyana of Nagano, Japan for example.

Spheres formed as described above may be formed into porous structures such as metallic foams. Various known metallic foam materials are suitable for the applications described herein. Such foams are commercially available from, for example, GKN Sinter Metals Filters GmbH of Germany.

Referring to FIGS. 1 and 4, in one embodiment of the filter assembly, nodules 36b are positioned between two substantially concentric longitudinal cylindrical baffle plates 40 and 42, then brazed or sintered to provide a porous structure as previously described. Baffle plate 40 has a one or more apertures 40a formed therealong to enable fluid communication between combustion chamber 26 and porous structure 36a. Baffle plate 42 has a one or more apertures 42a formed therealong to enable fluid communication between porous structure 36a and an exterior of the baffle plate. Apertures 40a and 42a may be formed in positions along their respective baffle plates such that, when the filter is assembled, a tortuous flow path through the filter assembly is provided for combustion products emanating from combustion chamber 26. Thus, baffle plates 40 and 42 impart a desired shape to the porous structure 36a, add structural integrity to the filter assembly, and also provide a tortuous flow path for generated gases to aid in cooling and removal of particulates from the gases.

In another embodiment (not shown), nodules 36b are positioned in a container or die which is configured to impart a desired shape to the porous structure 36a. The nodules are then brazed or sintered to provide a porous structure as previously described.

Referring again to FIG. 1, filter assembly 36 may be radially spaced apart from housing wall 12c so as to form an annular gas flow passage 37 between the filter assembly and the housing-wall. In addition, openings 12d in housing wall 12c and apertures 42a formed along baffle plate 42 may be positioned relative to each other so as to provide a tortuous flow path for gases exiting the filter assembly to an exterior of housing 12. This ensures an additional level of cooling for the gases, if so desired.

Referring to FIGS. 1 and 2, an igniter assembly 44 is positioned and secured within first end closure central orifice 14b so as to enable fluid communication between a cavity 46 containing an associated ignition compound 48 (described in greater detail below), and an igniter 44a incorporated into the igniter assembly for igniting the ignition compound 48 upon activation of the gas generating system. Igniter assembly 44 may be secured in central orifice 14b using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products by, of The Netherlands. Igniter 44a may be formed as known in the art. Exemplary igniter constructions are described in U.S. Pat. Nos. 6,009,809 and 5,934,705, incorporated herein by reference. Igniter 44a may be secured within igniter assembly 44 by any one of a variety of methods, for instance using welds, adhesives, by crimping, or by integrally molding the igniter into a portion of the igniter assembly.

Referring to FIGS. 1 and 2, a plate 50 is positioned within housing 12 spaced apart from first end closure 14. At least one orifice 50a is provided in plate 50 to enable fluid communication between igniter assembly 44 and combustion chamber 26 containing gas generant composition 30 (described in greater detail below). In the embodiment shown in FIG. 1, a plurality of orifices 50a is formed in plate 50. Plate 50 is made from a metal or metal alloy and may be stamped or otherwise metal-formed.

As seen in FIGS. 1 and 4, first end closure 14, plate 50, and filter assembly 36 combine to define an ignition or booster cavity 46 for containing an ignition compound 48 therein. Referring again to FIGS. 1 and 2, an orifice plate 52 is positioned within central orifice 14b of first end closure 14 between igniter 44a and booster cavity 46. Plate 52 has one or more orifices 52a formed therealong to enable fluid communication between igniter 44a and the ignition compound 48 in cavity 46 upon activation of the gas generating system. Plate 52 is made from a metal or metal alloy and may be cast, stamped, or otherwise metal-formed.

Referring to FIG. 1, a perforated plate 53 is positioned within central orifice 14b of first end closure 14 to abut orifice plate 52 between orifice plate 52 and igniter 44a. Plate 53 has a plurality of orifices 53a formed therealong to enable fluid communication between igniter 44a and orifice plate 52 upon activation of the gas generating system. Plate 53 is made from a metal or metal alloy and may be cast, stamped, or otherwise metal-formed.

Referring again to FIG. 1, a quantity of an ignition compound 48 is contained within cavity 46. In the embodiment shown in FIG. 1, ignition compound 48 is a known or suitable ignition or booster compound, whose combustion ignites main gas generant charge 30 positioned in combustion chamber 26. One or more autoignition tablets (not shown) may be placed in booster cavity 46, allowing ignition of ignition compound 48 upon external heating in a manner well-known in the art.

Referring again to FIG. 1, filter assembly 36, plate 50, and a spring plate 54 (described in greater detail below) combine to define a combustion chamber 26 for containing a quantity of a gas generant composition 30 therein.

Gas generant composition 30 is housed within combustion chamber 26 for production of gases upon ignition thereof. In the embodiment shown, gas generant 30 is in the form of a plurality of annular wafers stacked along at least a portion of chamber 26. It will be appreciated that other, alternative arrangements of the gas generant composition may be used. For example, combustion chamber 26 may be partially or completely filled with a gas generant in granulated or tablet form.

Both ignition compound 48 and gas generant composition 30 may be formulated by known methods, and is exemplified by those described in U.S. Pat. Nos. 5,035,757, 6,210,505, or 6,620,266, all herein incorporated by reference.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Alkali metal nitrates, chlorates and perchlorates are other useful oxidizers when combined with a high-temperature slag former.

Accordingly, the pyrotechnic, slag forming gas generating mixture disclosed in U.S. Pat. No. 5,037,757 comprises at least one each of the following materials.

a. A fuel selected from the group of tetrazole compounds consisting of aminotetrazole, tetrazole, bitetrazole and metal salts of these compounds as well as triazole compounds and metal salts of triazole compounds.

b. An oxygen containing oxidizer compound selected from the group consisting of alkali metal, alkaline earth metal, lanthanide and ammonium nitrates and perchlorates or from the group consisting of alkali metal or alkaline earth metal chlorates or peroxides.

c. A high temperature slag forming material selected from the group consisting of alkaline earth metal or transition metal oxides, hydroxides, carbonates, oxalates, peroxides, nitrates, chlorates and perchlorates or from the group consisting of alkaline earth metal salts of tetrazoles, bitetrazoles and triazoles.

d. A low-temperature slag forming material selected from the group consisting of silicon dioxide, boric oxide and vanadium pentoxide or from the group consisting of alkali metal silicates, borates, carbonates, nitrates, perchlorates or chlorates or from the group consisting of alkali metal salts of tetrazoles, bitetrazoles and triazoles or from the group consisting of the various naturally occurring clays and talcs.

In practice, certain of the materials may be substituted or interchanged. Specifically, both the fuel and the high-temperature slag forming material may be selected from the group consisting of alkaline earth metal salts of tetrazoles, bitetrazoles and triazoles. Both the oxygen containing oxidizer compound and high-temperature slag forming material may be comprised of one or more of the group consisting of alkaline earth metal and lanthanide nitrates, perchlorates, chlorates and peroxides. Both the fuel and the low-temperature slag forming material may comprise one or more of the group consisting of alkali metal salts of tetrazoles, bitetrazoles and triazoles. Both the oxygen containing oxidizer compound and the low-temperature slag forming material may comprise one or more of the group consisting of alkali metal nitrates, perchlorates, chlorates and peroxides.

The fuel may comprise 5-aminotetrazole which is present in a concentration of about 22 to about 36% by weight, where the oxygen containing oxidizer compound and high-temperature slag former is strontium nitrate which is present in a concentration of about 38 to about 62% by weight, and said low-temperature slag former is silicon dioxide which is present in a concentration of about 2 to about 18% by weight.

Alternatively, the fuel and high-temperature slag forming material may comprise the strontium salt of 5-aminotetrazole which is present in a concentration of about 30 to about 50% by weight, where the oxygen containing oxidizer compound is potassium nitrate which is present in a concentration of about 40 to about 60% by weight, and the low-temperature slag former is talc which is present in a concentration of about 2 to about 10% by weight. The talc may be replaced by clay.

Another combination comprises the 5-aminotetrazole which is present in a combination of about 22 to about 36% by weight, where the oxygen containing oxidizer compound is sodium nitrate which is present in a concentration of about 30 to about 50% by weight, the high-temperature slag forming material is magnesium carbonate which is present in a concentration of about 8 to about 30% by weight, and the low-temperature slag former is silicon dioxide which is present in a concentration of about 2 to about 20% by weight. Magnesium carbonate may be replaced by magnesium hydroxide.

Yet another combination comprises the potassium salt of 5-aminotetrazole which is present in a concentration of about 2 to about 30% by weight which serves in part as a fuel and in part as a low-temperature slag former and wherein 5-aminotetraozle in a concentration of about 8 to about 40% by weight also serves as a fuel, and wherein clay in a concentration of about 2 to about 10% by weight serves in part as the low-temperature slag former and wherein strontium nitrate in a concentration of about 40 to about 66% by weight serves as both the oxygen containing oxidizer and high-temperature slag former.

U.S. Pat. No. 6,210,505 discloses high nitrogen nonazides employed as primary fuels in gas generant compositions which include, in particular, ammonium, amine, amino, and amide nonmetal salts of tetrazole and triazole selected from the group including monoguanidinium salt of 5,5'-Bi-1H-tetrazole (BHT.1GAD), diguanidinium salt of 5,5'-Bi-1H-tetrazole (BHT.2GAD), monoaminoguanidinium salt of 5,5'-Bi-1H-tetrazole (BHT.1AGAD), diaminoguanidinium salt of 5,5'-Bi-1H-tetrazole (BHT.2AGAD), monohydrazinium salt of 5,5'-Bi-1H-tetrazole (BHT.1HH), dihydrazinium salt of 5,5'-Bi-1H-tetrazole (BHT.2HH), monoammonium salt of 5,5'-Bi-1H-tetrazole (BHT.1NH$_3$), diammonium salt of 5,5'-Bi-1H-tetrazole (BHT.2NH$_3$), mono-3-amino-1,2,4-triazolium salt of 5,5'-Bi-1H-tetrazole (BHT.1ATAZ), di-3-amino-1,2,4-triazolium salt of 5,5'-Bi-1H-tetrazole (BHT.2ATAZ), diguanidinium salt of 5,5'-Azobis-1H-tetrazole (ABHT.2GAD), and monoammonium salt of 5-Nitramino-1H-tetrazole (NAT-1NH$_3$). The primary fuel generally comprises about 13 to 38%, and more preferably about 23 to 28%, by weight of the gas generating composition.

Formula I

Formula II

A generic nonmetal salt of tetrazole as shown in Formula I includes a cationic component, Z, and an anionic component comprising a tetrazole ring and an R group substituted on the 5-position of the tetrazole ring. A generic nonmetal salt of triazole as shown in Formula II includes a cationic component, Z, and an anionic component comprising a triazole ring and two R groups substituted on the 3- and 5-positions of the triazole ring, wherein $R_1$ may or may not be structurally synonymous with $R_2$. An R component is selected from a group including hydrogen or any nitrogen-containing compound such as an amino, nitro, nitramino, or a tetrazolyl or triazolyl group from Formula I or II, respectively, substituted directly or via amine, diazo, or triazo groups. The compound Z forms a cation by displacing a hydrogen atom at the 1-position of either formula, and is selected from an amine group including ammonia, hydrazine; guanidine compounds such as guanidine, aminoguanidine, diaminoguanidine, triaminoguanidine, and nitroguanidine; amides including dicyandiamide, urea, carbohydrazide, oxamide, oxamic hydrazide, Bi-(carbonamide)amine, azodicarbonamide, and hydrazodicarbonamide; and substituted azoles including 3-amino-1,2, 4-triazole, 3-amino-5-nitro-1,2,4-triazole, 5-aminotetrazole, 3-nitramino-1,2,4-triazole, and 5-nitraminotetrazole; and azines such as melamine.

The foregoing nonmetal salts of tetrazole or triazole are dry-mixed with phase stabilized ammonium nitrate (PSAN). PSAN is generally employed in a concentration of about 46 to 87%, and more preferably 56 to 77%, by weight of the total gas generant composition. The ammonium nitrate is stabilized by potassium nitrate as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

The gas generants further contain a metallic oxidizer selected from alkali metal and alkaline earth metal nitrates and perchlorates. One of ordinary skill will readily appreciate that other oxidizers such as metallic oxides, nitrites, chlorates, peroxides, and hydroxides may also be used. The metallic oxidizer is present at about 0.1-25%, and more preferably 0.8-15%, by weight of the gas generating composition.

The gas generants yet further contain an inert component selected from the group containing silicates, silicon, diatomaceous earth, and oxides such as silica, alumina, and titania. The silicates include but are not limited to silicates having layered structures such as talc and the aluminum silicates of clay and mica; aluminosilicate; borosilicates; and other silicates such as sodium silicate and potassium silicate. The inert component is present at about 0.1-8%, and more preferably at about 0.1-3%, by weight of the gas generating composition.

A preferred embodiment contains 56-77% of PSAN, 23-28% of diammonium salt of 5,5'-Bi-1H-tetrazole (BHT.2NH3), 0.8-15% of strontium nitrate, and 0.1-3% of clay.

The combination of the metallic oxidizer and the inert component results in the formation of a mineral containing the metal from the metallic oxidizer. For example, the combination of clay, which is primarily aluminum silicate ($Al_2Si_4O_{10}$) and quartz ($SiO_2$) with strontium nitrate (Sr $(NO_3)_2$) results in a combustion product consisting primarily of strontium silicates ($SrSiO_4$ and $Sr_3SiO_5$). It is believed that this process aids in sustaining the gas generant combustion at all pressures and thus prevents gas generating system "no-fires".

Burn rates of gas generants containing a nonmetal salt as defined above, PSAN, an alkaline earth metal oxidizer, and an inert component are low (around 0.30 ips at 1000 psi), lower than the industry standard of 0.40 ips at 1000 psi. Thus, these compositions quite unexpectedly ignite and sustain combustion much more readily than other gas generants having burn rates below 0.40 ips at 1000 psi, and in some cases, perform better than gas generants having burn rates greater than 0.40 ips.

Optional ignition aids, used in conjunction with the present invention, are selected from nonazide fuels including triazoles, triazolone, aminotetrazoles, tetrazoles, or bitetrazoles, or others as described in U.S. Pat. No. 5,139,588 to Poole, the teachings of which are herein incorporated by reference. Conventional ignition aids such as $BKNO_3$ are no longer required because a gas generant containing a tetrazole or triazole based fuel, phase stabilized ammonium nitrate, a metallic oxidizer, and an inert component exhibits improved ignitability of the propellant and also provides a sustained burn rate with repeatable combustible performance.

The manner and order in which the components of the gas generating composition of the present invention are combined and compounded is not critical so long as a uniform mixture is obtained and the compounding is carried out under conditions which do not cause decomposition of the components employed. For example, the materials may be wet blended, or dry blended and attrited in a ball mill or Red Devil type paint shaker and then pelletized by compression molding. The materials may also be ground separately or together in a fluid energy mill, sweco vibroenergy mill or bantam micropulverizer and then blended or further blended in a v-blender prior to compaction.

When formulating a composition, the ratio of PSAN to fuel is adjusted such that the oxygen balance is between −4.0% and +1.0% $O_2$ by weight of composition as described above. More preferably, the ratio of PSAN to fuel is adjusted such that the composition oxygen balance is between −2.0% and 0.0% $O_2$ by weight of composition. It can be appreciated that the relative amount of PSAN and fuel will depend both on the additive used to form PSAN as well as the nature of the selected fuel.

In Tables 1 and 2 below, PSAN is phase-stabilized with 15% KN of the total oxidizer component in all cases except those marked by an asterisk. In that case, PSAN is phase-stabilized with 10% KN of the total oxidizer component.

In accordance with the present invention, these formulations will be both thermally and volumetrically stable over a temperature range of −40° C. to 10° C.; produce large volumes of non-toxic gases; produce minimal solid particulates; ignite readily and burn in a repeatable manner; contain no toxic, sensitive, or explosive starting materials; and, be non-toxic, insensitive, and non-explosive in final form.

TABLE 1

| EX | Composition by Weight Percent | Moles of Gas/ 100 g of Generant | Grams of Solids/ 100 g of Generant | Oxygen Balance by Weight Percent | Burn Rate at 1000 psi (in/sec) |
|---|---|---|---|---|---|
| 1 | 76.43% PSAN 23.57% BHT•2NH3 | 4.00 | 5.34 | 0.0% | 0.48 |
| 2 | 75.40% PSAN 24.60% BHT•2NH3 | 4.00 | 5.27 | −1.0% | 0.47 |
| 3 | 72.32% PSAN 27.68% BHT•2NH3 | 4.00 | 5.05 | −4.0% | 0.54 |

TABLE 2

| EX | Composition in Weight Percent | Mol Gas/ 100 g of Generant | Grams of Solids/ 100 g of Generant | Oxygen Balance in Weight Percent |
|---|---|---|---|---|
| 4 | 73.06% PSAN* 26.94% BHT•2NH3 | 4.10 | 3.40 | −4.0% |
| 5 | 76.17% PSAN* 23.83% BHT•2NH3 | 4.10 | 3.55 | −1.0% |
| 6 | 78.25% PSAN* 21.75% BHT•2NH3 | 4.10 | 3.65 | +1.0% |
| 7 | 73.08% PSAN 26.92% BHT•1GAD | 3.95 | 5.11 | −4.0% |
| 8 | 76.08% PSAN 23.92% BHT•1GAD | 3.95 | 5.32 | −1.0% |
| 9 | 78.08% PSAN 21.92% BHT•1GAD | 3.95 | 5.46 | +1.0% |
| 10 | 73.53% PSAN 26.47% ABHT•2GAD | 3.95 | 5.14 | −4.0% |

TABLE 2-continued

| EX | Composition in Weight Percent | Mol Gas/ 100 g of Generant | Grams of Solids/ 100 g of Generant | Oxygen Balance in Weight Percent |
|---|---|---|---|---|
| 11 | 76.48% PSAN 23.52% ABHT•2GAD | 3.95 | 5.34 | −1.0% |
| 12 | 78.45% PSAN 21.55% ABHT•2GAD | 3.95 | 5.48 | +1.0% |
| 13 | 46.27% PSAN 53.73% NAT•1NH$_3$ | 3.94 | 3.23 | −4.0% |
| 14 | 52.26% PSAN 47.74% NAT•1NH$_3$ | 3.94 | 3.65 | −1.0% |
| 15 | 56.25% PSAN 43.75% NAT•1NH$_3$ | 3.95 | 3.93 | +1.0% |

U.S. Pat. No. 6,620,266 discloses improving the combustion and ballistic properties of a given nonazide gas generant composition, particularly within a gas generator of an airbag gas generating system or within a seatbelt pretensioner, by coating the gas generant composition with silicone. By coating the outside of the generant pellets or granules with a curable silicone or silicone gumstock, an easily ignitable formulation that sustains combustion is obtained. Exemplary gas generating systems/gas generators include those described in co-owned U.S. Pat. Nos. 5,628,528, 5,622,380, 5,727,813, and 5,806,888 herein incorporated by reference. Exemplary pretensioners include those described in U.S. Pat. Nos. 5,397,075 and 5,899,399, herein incorporated by reference.

Figure 11:
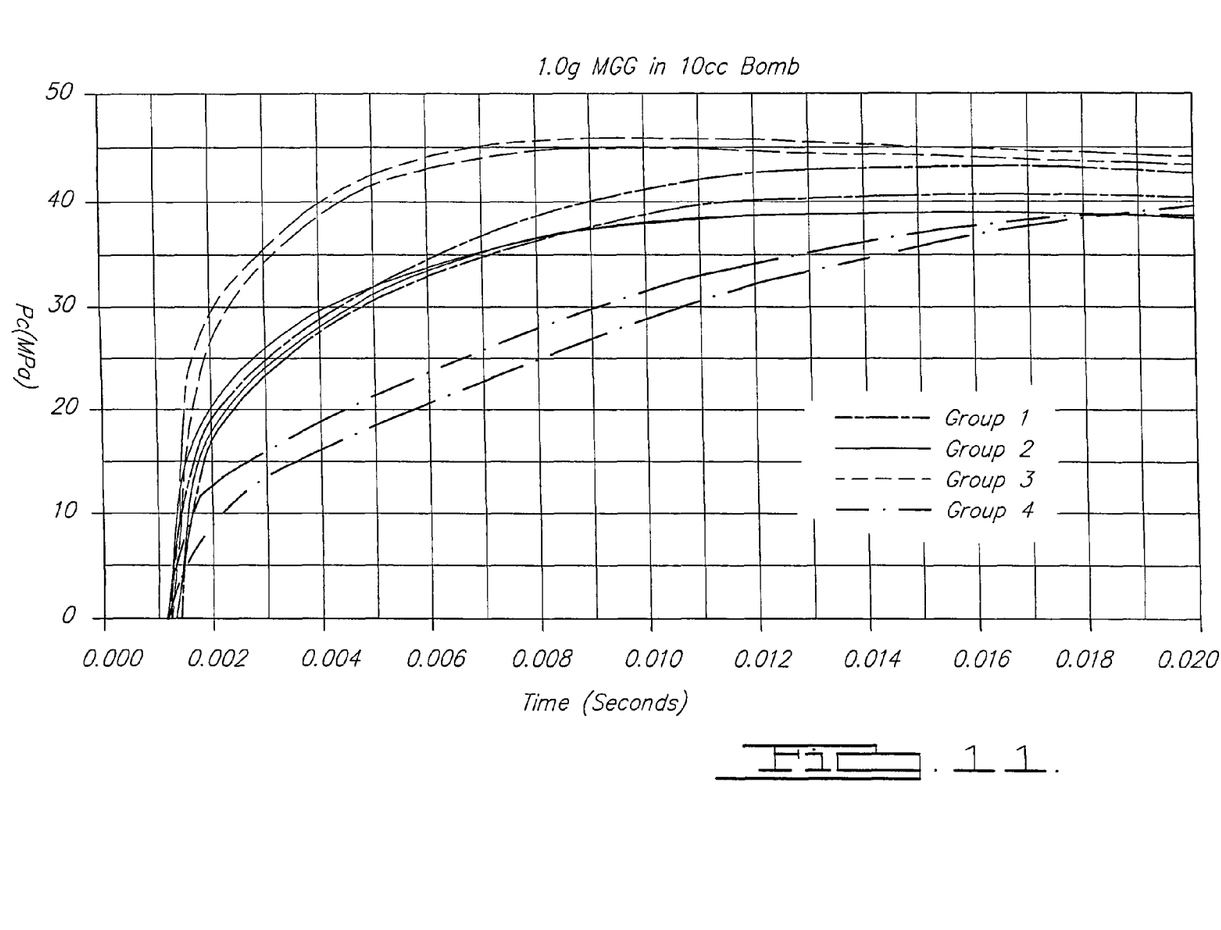
FIG. 11 exemplifies ballistic curves of typical gas generant compositions containing binders.

The nonazide gas generant compositions contain one or more fuels, at least one oxidizer, and if desired, other additives well known in the art. In general, compounds that function primarily as binders are not required given that the granules, pellets or tablets are pressure formed. Therefore, elastomeric binders (i.e. rubber or silicone, and the like) are not combined or mixed into the gas generant composition, particularly in view of the ballistic performance of gas generant compositions containing such binders. See FIG. 11. Other binders not having an elastomeric nature may be used if desired, however.

Stated another way, the gas generant compositions do not include azides as fuels, nor do they contain any azido or azide groups within any constituent combined therein. The gas generant compositions contemplated herein contain a nitrogen-containing fuel selected from the group including tetrazoles, bitetrazoles, triazoles, triazines, guanidines, nitroguanidines, metal and nonmetal salts and derivatives of the foregoing fuels, and mixtures thereof; and, an oxidizer selected from the group including nonmetal or metal (alkali, alkaline earth, and transitional metals) nitrates, nitrites, chlorates, chlorites, perchlorates, oxides, and mixtures thereof. Exemplary fuels include nitroguanidine, guanidine nitrate, aminoguanidine nitrate, 1H-tetrazole, 5-aminotetrazole, 5-nitrotetrazole, 5,5'-bitetrazole, diguanidinium-5,5'-azotetrazolate, nitroaminotriazole, and melamine nitrate; and metal and nonmetal salts of the foregoing fuels.

U.S. Pat. Nos. 5,035,757, 5,139,588, 5,531,941, 5,756,929, 5,872,329, 6,077,371, and 6,074,502, herein incorporated by reference, exemplify, but do not limit, suitable gas generant compositions. In general, any gas generant composition (within any gas generator or any pretensioner, for example) may be coated with silicone, thereby resulting in improved ignitability and improved combustion and ballistic properties. The burn rate is vigorously sustained throughout combustion of a gas generant composition coated with silicone.

Exemplary nitrated fuels employed in "smokeless" gas generant compositions include nitrourea, 5-aminotetrazole nitrate (5ATN), dinitrodiaminotriazole, urea nitrate, azodicarbonamide nitrate, hydrazodicarbonamide nitrate, semicarbazide nitrate, and carbohydrazide nitrate, biuret nitrate, 3,5-diamino-1,2,4-triazole nitrate, dicyandiamide nitrate, and 3-amino-1,2,4-triazole nitrate. Certain fuels may be generically described as containing a nitrated base fuel such that the end compound will be the base fuel plus HNO$_3$ For example, urea nitrate is H$_2$NCONH$_2$HNO$_3$. It is conceivable that some of the fuels may be dinitrates although most will be mononitrates.

One or more "smokeless" fuels may also be selected from the group including amine salts of tetrazole and triazole including monoguanidinium salt of 5,5'-Bis-1H-tetrazole (BHT.1 GAD), bis-(1 (2)H-tetrazole-5-yl)-amine (BTA.2NH$_3$), diguanidinium salt of 5,5'-Bis-1H-tetrazole (BHT.2GAD), monoaminoguanidinium salt of 5,5'-Bis-1H-tetrazole (BHT.1AGAD), iaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH$_3$), diammonium salt of 5,5'-bis-1H-tetrazole (BHT.2NH$_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), 5,5'-Azobis-1H-tetrazole (ABHT.2GAD), and monoammonium salt of 5-Nitramino-1H-tetrazole (NAT.1NH$_3$). Co-owned U.S. Pat. Nos. 5,872,329, 5,501,823, 5,783,773, and 5,545,272, each incorporated by reference herein, further elaborate on other "smokeless" gas generants and the manufacture thereof. Other "smokeless" gas generant compositions known in the art and as defined herein are also contemplated.

The gas generant compositions of the present invention further contain one or more inorganic oxidizers selected from the group of nonmetal, alkali metal, and alkaline earth metal nitrates and nitrites for example. Other oxidizers well known in the art may also be used. These include oxides or coordination complexes, for example. Preferred oxidizers include phase stabilized ammonium nitrate, ammonium nitrate, potassium nitrate, and strontium nitrate.

The gas generant composition, absent the silicone coating, contains 15-95% by weight of fuel and 5-85% by weight of oxidizer. The gas generant composition more preferably contains 20-85% by weight of fuel, and 15-80% by weight of oxidizer (not including the silicone coating). The gas generant constituents are homogeneously dry or wet blended and then formed into granules (800 μm to 12 mm, and more preferably 0.1 mm to 3 mm, in rough diameter), pellets, tablets, or other desired shapes by well known methods such as extrusion or pressure forming methods. The gas generant composition is then physically coated with 1-50%, and more preferable 3-20%, by weight (gas generant and the silicone) of a silicone gumstock or curable silicone polymer. Gas generant granules, tablets, pellets, or other desired shapes are formed and then added with an effective amount of silicone to a tumble blender and blended, preferably for at least two hours.

The term "silicone" as used herein will be understood in its generic sense. Hawley describes silicone (organosiloxane) as any of a large group of siloxane polymers based on a structure consisting of alternate silicon and oxygen atoms with various organic radicals attached to the silicon:

Formula 1

Silicone Example

Or, silicone can be more generically represented as shown in Formula 2:

Formula 2

Silicone Example

Note, "n" in the Formulas indicates a multiple of the polymeric group or portion of the molecule given within the brackets, to include the organic groups attached to the silicon.

Exemplary silicones include those disclosed in U.S. Pat. Nos. 5,589,662, 5,610,444, and 5,700,532, and, in Technology of Polymer Compounds and Energetic Materials, Fraunhofer-Institut fur Chemische Technologie (ICT), 1990, each reference and document herein incorporated by reference.

Standard slag formers and coolants may also be incorporated if desired. Binders are not generally utilized because the gas generant constituents described herein are homogeneously blended and then preferably compacted or formed into granules or other shapes through pressure or other known physical methods. If binders are used, however, elastomeric, rubber, or silicone binders are not combined in the present compositions given the poor ballistic performance shown in FIG. 11.

Other "smokeless" gas generant compositions containing 5-ATN, or any other nitrated base fuel, are also contemplated. The base fuels include, but are not limited to, nitrourea, 5-aminotetrazole, diaminotriazole, urea, azodicarbonamide, hydrazodicarbonamide, semicarbazide, carbohydrazide, biuret, 3,5-diamino-1,2,4-triazole, dicyandiamide, and 3-amino-1,2,4-triazole. Each of these base fuels may be nitrated and combined with one or more oxidizers. Thus, methods of forming gas generant compositions containing 5ATN and one or more oxidizers, as described below but not thereby limited, exemplify the manufacture of gas generant compositions containing any nitrated base fuel and one or more oxidizers.

The constituents of the nitrated gas generant compositions may all be obtained from suppliers well known in the art. In general, the base fuel (in this case 5AT) and any oxidizers are added to excess concentrated nitric acid and stirred until a damp paste forms. This paste is then formed into granules by either extrusion or forcing the material through a screen. The wet granules are then dried.

The nitric acid can be the standard reagent grade (15.9M, ~70 wt. % $HNO_3$) or can be less concentrated as long as enough nitric acid is present to form the mononitrate salt of 5AT. The nitric acid should be chilled to 0-20° C. before adding the 5AT and oxidizers to ensure that the 5AT does not decompose in the concentrated slurry. When mixing the 5AT and oxidizers in the nitric acid medium, the precise mixing equipment used is not important—it is simply necessary to thoroughly mix all the components and evaporate the excess nitric acid. As with any process using acids, the materials of construction must be properly selected to prevent corrosion. In addition, sufficient ventilation and treatment of the acid vapor is required for added safety.

After forming a wet paste as described above, several methods can be used to form granules. The paste can be placed in a screw-feed extruder with holes of desired diameter and then chopped into desired lengths. An oscillating granulator may also be used to form granules of desired size. The material should be kept wet through all the processing steps to minimize safety problems. The final granules can be dried in ambient pressure or under vacuum. It is most preferred to dry the material at about 30° C. under a -12 psig vacuum.

Figure 3:
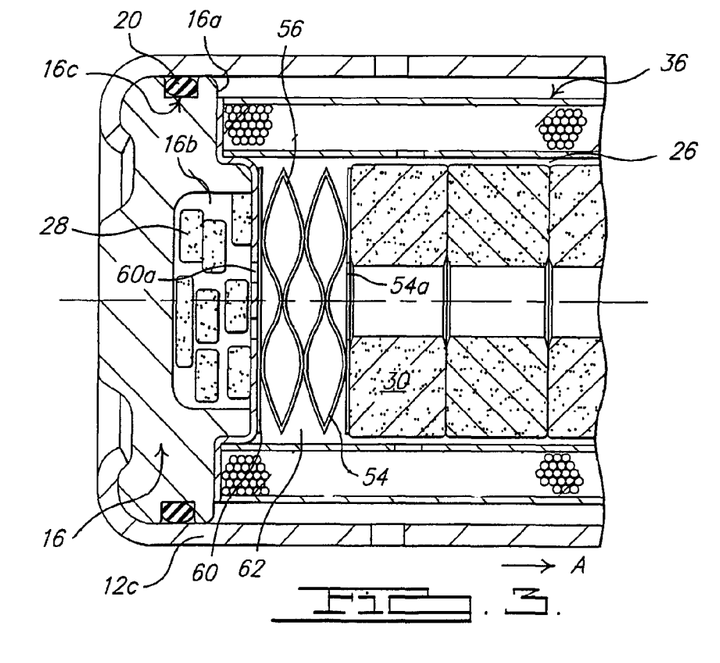
FIG. 3 is an amplified view of a first end of the inflator of FIG. 1.

Referring to FIGS. 1 and 3, a spring plate 54 is positioned in combustion chamber 26 at an opposite end of the gas generant stack from plate 50. At least one orifice 54a is formed in plate 54 to enable fluid communication between combustion chamber 26 on one side of plate 54 and an exterior of the combustion chamber on an opposite side of the plate. In the embodiment shown in FIG. 1, a plurality of orifices 54a is formed in plate 54. Spring plate 54 is adapted to be movable along combustion chamber 26 so as to abut gas generant 30 under the influence of a spring member 56 (described in greater detail below). Plate 54 is made from a metal or metal alloy and may be stamped or otherwise metal-formed.

Referring to FIGS. 1 and 3, an endplate 60 is positioned abutting second end closure 16. At least one orifice 60a is provided in plate 60 to enable fluid communication between cavity 16b containing auto-ignition composition 28 on a first side of the plate, and a spring cavity 62 formed along a second side of the plate. In the embodiment shown in FIG. 1, a plurality of orifices 60a is formed in plate 60. Plate 60 is made from a metal or metal alloy and may be a stamped or otherwise metal-formed.

As seen in FIG. 1, plates 54 and 60 and filter assembly 36 combine to form a spring cavity 62 for containing a spring member 56 therein. Spring member 56 is positioned in spring cavity 62 to abut plates 54 and 60. Spring member 56 is configured to have a spring constant that enables the spring to move movable plate along the interior of housing 12 in response to the volume occupied by gas generant 30 in combustion chamber 26. Spring member 56 exerts a biasing force on movable plate 54 acting in the direction indicated by arrow "A", thereby urging the gas generant against plate 50 at housing first end 12a. This enables the quantity of gas generant in combustion chamber to be varied according to design requirements, while minimizing movement of the gas generant within the combustion chamber which may contribute to fracturing and rearrangement of gas generant (such as gas generant 30) having a particular geometry or spacial arrangement. Spring member 56 may have any one of several configurations, such as a coil spring, a spiral spring, a leaf spring, or any other configuration suitable for providing the required biasing force while being enclosable in cavity 62. Spring member 56 may be formed from a metal, metal alloy, or a polymer material.

Operation of the gas generator will now be discussed with reference to FIG. 1-4. Upon receipt of a signal from a crash sensor, an electrical activation signal is sent to igniter 44a. Combustion products from the igniter expand into cavity 46, igniting booster compound 48 positioned in booster cavity 46. Products from the combustion of booster compound 48 proceed out of cavity 46 through orifice 52a in plate 52 to ignite gas generant composition 30. Combustion products such as hot gas, flame, and hot solids proceed through baffle plate orifices 40*a* into porous structure 36*a*, flowing thorough the porous structure to exit the filter assembly through baffle plate orifices 42*a*. The gases then proceed to exit the gas generating system housing through orifices 12*d* in housing wall 12*c*. The gas thus follows a tortuous and radially outward path through the multitude of fluid flow paths of the porous filter assembly, during which the gases are cooled and slag is removed from the gases.

Figure 5:
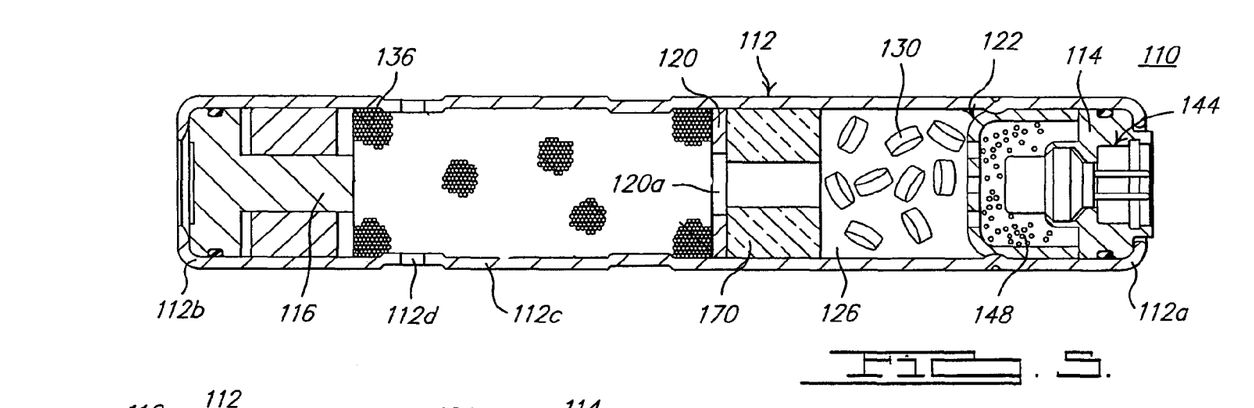
FIG. 5 is an amplified view of a second end of the inflator of FIG. 1.

FIG. 5 shows another embodiment of a gas generating system in accordance with the present invention. In FIG. 5, like numerals are used to identify features similar to those identified in FIGS. 1-4. Gas generating system 110 includes a housing 112, a first end closure 114, an igniter assembly 144, a pyrotechnic booster compound 148, a gas generant composition 130, and a second end closure 116 substantially as previously described with respect to gas generating system 10 (FIG. 1). In the embodiment shown in FIG. 5, gas generant composition 130 is in tablet form.

An ignition cup 122 is positioned adjacent first end closure 116. Ignition cup 122 has a base portion 122*a* and an annular wall 122*b* extending from the base portion to abut first end closure 114 along a shoulder 114*a* formed along first end closure 114. Base portion 122*a*, wall 122*b*, and first end closure 114 define a cavity 124 for containing pyrotechnic compound 148 therein. At least one ignition gas exit orifice 122*c* is formed in ignition cup 122 for release of ignition compound combustion products once ignition compound 148 is ignited. In the embodiment shown in FIGS. 5 and 6, a plurality of orifices 122*c* is formed in base portion 122*a*. Wall 122*b* may be secured in position within housing 112 using an interference fit, a crimp, or other known methods. Ignition cup 122 may be stamped, extruded, die cast, or otherwise metal formed and may be made from carbon steel or stainless steel, for example. A rupturable, fluid-tight seal (not shown) may be positioned across base portion 122*a* to cover orifices 122*c*, thereby isolating cavity 124 from main combustion chamber 126 prior to activation of the gas generating system. The seal is secured to a face of ignition cup base portion 122*a* and forms a fluid-tight barrier between cavity 124 and main combustion chamber 126. Various disks, foils, films, tapes, etc. may be used to form the seal.

Referring again to FIG. 5, a bulkhead 120 is positioned and secured within housing 112 using a suitable method, such as provision of an interference fit or crimping. Bulkhead 120, housing walls 112*c*, and ignition cup 122 define main combustion chamber 126 in which gas generant composition 130 is stored.

Figure 7:
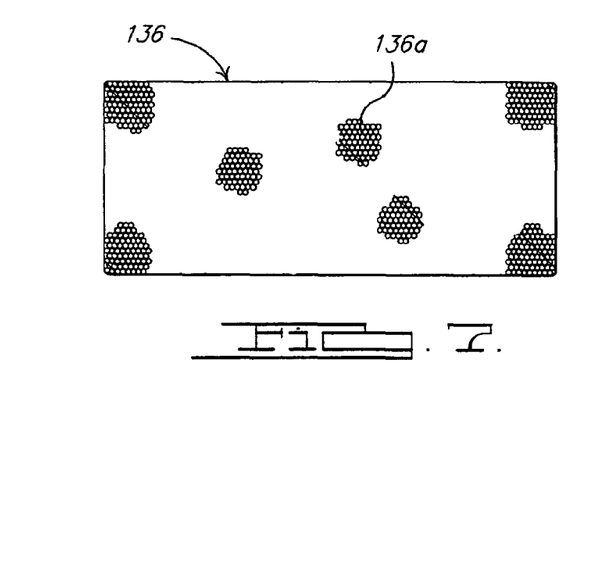
FIG. 7 exemplifies a second embodiment of a filter in accordance with the present invention.

Referring to FIGS. 5 and 7, a filter assembly 136, constructed substantially as previously described, is positioned within housing 112 on an opposite side of bulkhead 120 from combustion chamber 126. In the embodiment shown in FIGS. 5 and 7, filter assembly 136 is in the shape of a cylinder with nodules 136*b* as previously described distributed throughout the volume of the cylinder. The spheres are placed in a suitable mold or shaping container and then sintered or brazed to form a porous structure having the desired the cylindrical shape. The porous structure is then removed from the shaping container and positioned within the gas generating system. At least one orifice 120*a* is formed in bulkhead 120 to enable fluid communication between combustion chamber 126 and filter assembly 136.

Referring again to FIG. 5, a washer-like, pad cushion 170 formed from, for example, a ceramic fiber material is provided for holding the gas generant tablets 30 in place and for cushioning the gas generant tablets against vibration and impact. At least one orifice 170*a* is formed in cushion 170 to enable fluid communication between combustion chamber 126 and filter assembly 136.

Figure 6:
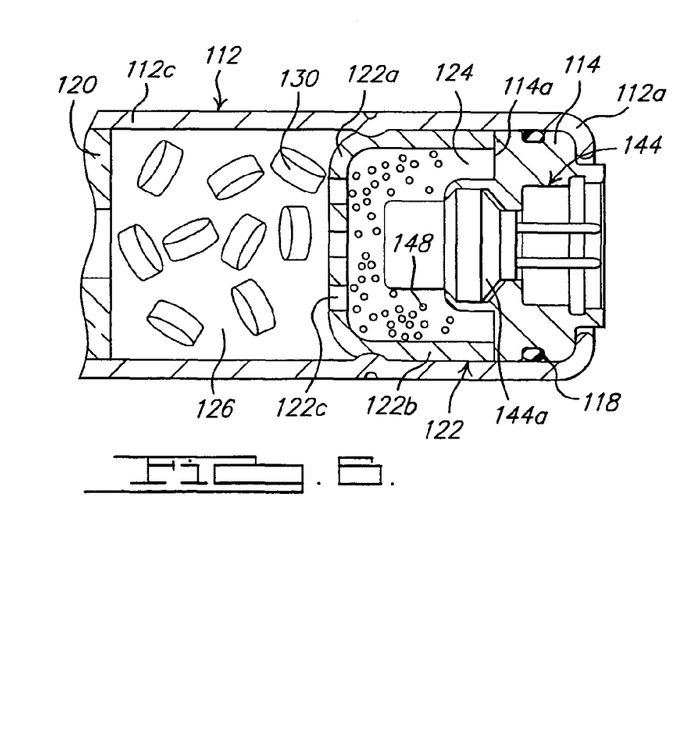
FIG. 6 is a second embodiment of an inflator in accordance with the present invention.

Operation of the embodiment shown in FIGS. 5 and 6 is substantially identical to that described for the embodiment shown in FIGS. 1-4. Gases produced in combustion chamber 126 flow through orifice 170*a* in cushion 170 and through orifice 120*a* in bulkhead 120, proceeding through the porous filter structure 136*a* to exit the filter assembly through orifices 142*a*. The gases then proceed to exit the gas generating system housing through orifices 112*d* in housing wall 112*c*.

Figure 8:
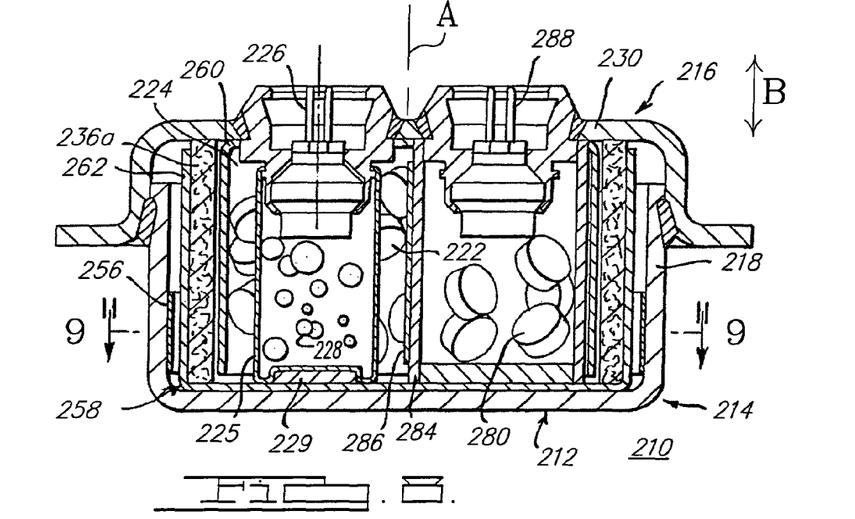
FIG. 8 is a sectional view of a third embodiment of an inflator of the present invention as shown in FIG. 9, taken along the line 8-8 of FIG. 9.
Figure 9:
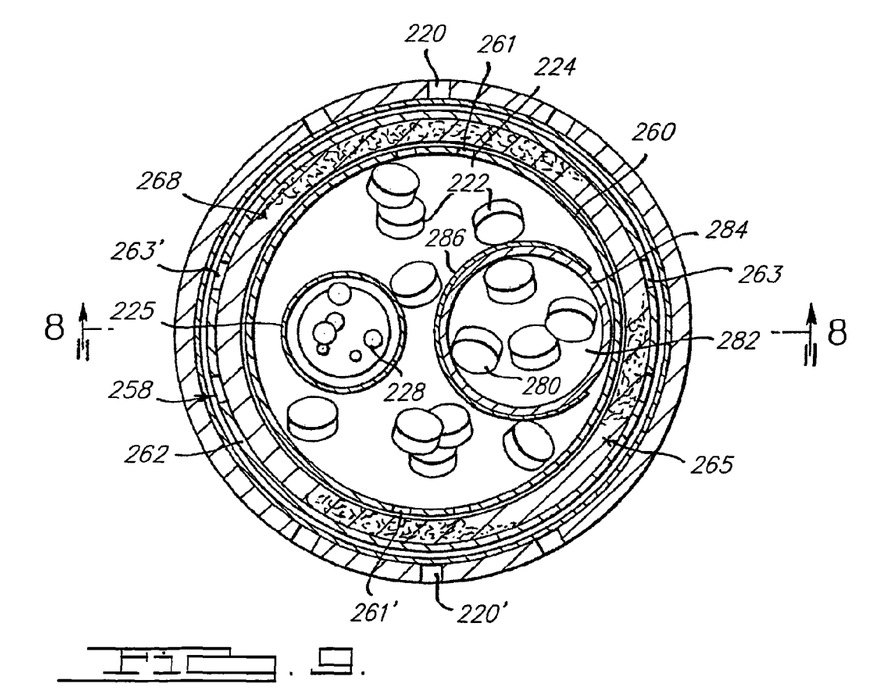
FIG. 9 is a sectional view of a third embodiment of an inflator of the present invention as shown in FIG. 8, taken along the line 9-9 of FIG. 8.

FIGS. 8 and 9 show a cross-sectional view of yet another alternative embodiment 210 of a gas generating system in accordance with the present invention. Referring to FIGS. 8 and 9, gas generating system 210 includes a generally cylindrical housing 212 having a closed end 214, an open end 216, and an outer wall 218 extending along a longitudinal axis "A". Housing 212 may be cast, stamped, or otherwise metal-formed. At least one and, preferably, a plurality of openings 220 are formed along housing wall 218 to permit fluid communication between an interior of the gas generating system and an exterior of the gas generating system. In addition, in the embodiment shown in FIGS. 8 and 9, at least one and, preferably, a plurality of openings 220' are formed along gas generating system outer wall 218 substantially diametrically opposite openings 220 formed along the outer wall.

Openings 220 may be covered with a foil 256 such as aluminum or stainless steel foil to prevent the incursion of water vapor into gas generating system housing 212. The foil 256, sometimes referred to as "burst foil" is typically of a thickness of from 0.01 to about 0.20 mm. The foil 256 is typically adhered to an interior surface of the gas generating system housing through the use of an adhesive.

A housing closure 230 is crimped, welded, or otherwise fixed to open end 216 of housing 212. Closure 230 may be cast, stamped, or otherwise metal-formed. Alternatively, closure 230 may be molded from a suitable high temperature-resistant polymer.

Gas generating system 210 also includes a first gas source positioned within the outer wall for releasably storing, generating, or otherwise providing a gas for circulation through the gas generating system and emanation from openings 220 and 220' in housing 212. In the embodiment shown in FIGS. 8 and 9, the first gas source comprises a gas generant composition 222 positioned within a combustion chamber 224 defined by a first baffle 260 (described in greater detail below) and end closure 230. Other gas sources are contemplated for use in the present invention. For example, in an alternative embodiment (not shown), a vessel containing a pressurized gas may be positioned within housing 212 for use as a gas source.

Gas generant composition 222 may be formulated by known methods, and is exemplified by those described in U.S. Pat. Nos. 5,035,757, 6,210,505, or 6,620,266, all herein incorporated by reference as previously described.

An igniter 226 is secured to gas generating system 210 so as to enable fluid communication with gas generant 222, for igniting the gas generant upon occurrence of a crash event. In the embodiment shown in FIGS. 8 and 9, igniter 226 is positioned and secured within an annular bore of housing closure 230 using known methods. In an alternative embodiment (not shown), a perforated igniter support tube may be welded or otherwise fixed within housing 212 to support igniter 226. The perforated support tube allows a flame front generated by igniter 226 to pass to gas generant 222, thereby igniting the gas generant to produce a gas. Igniter 226 may be formed as known in the art. Exemplary igniter constructions are described in U.S. Pat. Nos. 6,009,809 and 5,934,705, incorporated herein by reference.

Referring to FIGS. 8 and 9, a quantity of a known ignition or booster compound 228 may be positioned within gas generating system housing 212 so as to enable fluid communication between the booster compound and gas generant composition 222 upon activation of the gas generating system.

A cup 225 may be positioned within the gas generating system housing to enclose igniter 226 and to house booster propellant 228. Cup 225 may be stamped, extruded, die cast, or otherwise metal formed and may be made from carbon steel, stainless steel, or any other thermally conductive metal or metal alloy. Booster propellant 228 may be positioned in cup 225 to facilitate combustion of gas generant 222, in a manner known in the art. Activation of igniter 226 produces combustion of the booster propellant, thereby effecting ignition of gas generant-composition 222 in a manner known in the art. In addition, a cavity may be formed in an end surface of the booster cup for accommodating a quantity of a heat-activated auto-ignition compound 229.

A quantity of a known auto-ignition compound 229 may be positioned within the gas generating system so as to enable fluid communication between gas generant 222 and the auto-ignition compound upon activation of the gas generating system. In a manner known in the art, ignition of gas generant 222 is produced by ignition of auto-ignition material 229 resulting from heat from combustion of booster propellant 228. Auto ignition material 229 is a pyrotechnic material which is ignited by exposure to a temperature lower than the ignition temperature of gas generant 222. Auto-ignition material 229 produces a hot gas/particulate effluent when ignited. Suitable auto ignition materials are known to those skilled in the art. Examples of suitable auto-ignition materials are nitrocellulose based compositions and gun powder. Alternatively, combustion of gas generant 222 may be initiated by combustion of booster propellant 228 without the use of an auto-ignition material.

Referring again to FIGS. 8 and 9, a second gas source comprises a second gas generant composition 280 positioned within a combustion chamber 282 defined by a shell 284. Shell 284 may be formed from a metal or metal alloy.

Similar to gas generant 222 described above, second gas generant 280 may be formulated by known methods, and is exemplified by those described in U.S. Pat. Nos. 5,035,757, 6,210,505, or 6,620,266, all herein incorporated by reference as previously described.

A barrier 286 may be provided for fluidly isolating second gas generant 280 from first gas generant 222. Barrier 286 prevents sympathetic ignition of second gas generant 280 in response to ignition of first gas generant 222, by preventing flame and combustion products from combustion of the first gas generant from reaching the second gas generant. Barrier 286 is constructed and positioned along an exterior surface of shell 284 and is configured so as to be pierced, detached from shell 284, or otherwise perforated or destroyed by pressure resulting from ignition of second gas generant 280, to permit release of inflation gas from shell 284 into baffle system 258 upon ignition of the second gas generant. Barrier 286 may be formed from a sheet of high-temperature resistant metal or metal alloy.

A second igniter 288 is secured to gas generating system 210 so as to enable fluid communication with second gas generant 280 upon activation of the second igniter. In the embodiment shown in FIGS. 8 and 9, second igniter 288 is positioned and secured within a bore of housing closure 230 using known methods. In an alternative embodiment (not shown), a perforated igniter support tube (not shown) may be welded or otherwise fixed within housing 212 to support second igniter 288. The perforated support tube allows a flame front generated by second igniter 288 to pass to gas generant 280, thereby igniting the gas generant and producing an inflating gas. In this alternative embodiment, shell 284 forms a second combustion chamber 282 for containment of second gas generant 280. Second igniter 288 may be formed as known in the art. Exemplary igniter constructions are described in U.S. Pat. Nos. 6,009,809 and 5,934,705, incorporated herein by reference. If desired, second igniter 288 may be simultaneously or subsequently ignited with first igniter 226, thereby producing additional inflation gases from second gas generant 280.

Referring again to FIGS. 8 and 9, the gas generating system shown employs a generally cylindrical filter assembly 258 having a porous structure 236a constructed as previously described for conveying gases between combustion chamber 224 and gas generating system outer wall 218, and for cooling gases flowing therethrough. Filter assembly 258 is interposed between combustion chamber 224 and gas generating system outer wall 218 (i.e., filter assembly 258 is configured such that gases generated by combustion of gas generant 222 passes through the filter assembly in order to reach gas generating system outer wall 218.)

In the embodiment shown in FIGS. 8 and 9, filter assembly 258 includes an inner baffle 260, an outer baffle 262, and a porous structure 236a formed from nodules as previously described. In the embodiment shown in FIGS. 8 and 9, outer baffle 262 is arranged substantially concentrically with inner baffle 260 about longitudinal axis A to form a gas flow passage 265 between the two baffles, in which porous structure 236a is positioned.

As seen in FIG. 8, end portions of the baffles are spaced apart from the housing to provide gaps between the baffles and the housing through which inflation gases may migrate. In this embodiment, baffles 260 and 262 provide bidirectional fluid flow through the filter assembly substantially parallel to longitudinal axis A, along the directions indicated by arrow B. Inner baffle 260 preferably includes one or more gas transfer openings 261 spaced about the circumference of the inner baffle and juxtaposed near housing closure 230. Outer baffle 262 preferably contains one or more gas transfer openings 263 spaced about the circumference of the second baffle and juxtaposed closed end 214 of housing 212. Also as seen in FIGS. 8 and 9, a porous filter structure 236a constructed as previously described is positioned between inner baffle 260 and outer baffle 262.

Baffles 260 and 262 may be extruded, roll-formed, or otherwise metal formed, and may be made from aluminum or stainless steel, for example. Each baffle may be pierced to provide the orientation of the various gas transfer openings described above.

In an alternative embodiment (not shown), a system of orifices may be formed in the inner and outer baffles to provide circumferential flow of gases (i.e., flow directed along one or more planes substantially perpendicular to axis A) through the porous structure incorporated between the baffle elements. Circumferential flow of the gases may be combined with flow of the gases parallel with axis A to provide gas flow paths of varying lengths within the gas generating system.

Operation of the embodiment shown in FIGS. 8 and 9 will now be discussed.

Upon a crash event, a signal from a crash sensor (not shown) is conveyed to igniter 226, thereby activating booster compound 228. In the embodiment shown in FIGS. 3 and 4, a signal from the crash sensor may also be conveyed (simultaneously or subsequently) to second igniter 288, thereby activating second igniter 88 and igniting second gas generant 280. Heat from ignition of booster propellant 228 transferred through produces ignition of auto-ignition compound 229, thereby igniting gas generant 222.

Combustion gases first flow through openings 261 in inner baffle 260. The gases then migrate upwardly through porous structure 236a and then flow through openings 263 in outer baffle 262. Once past the outer baffle, the gases then flow downwardly toward the housing gas exit openings 220 and out therethrough for inflation of the associated-airbag. In this embodiment, it may be seen that the inflation gases flow through the baffle system substantially parallel to longitudinal axis A.

Figure 10:
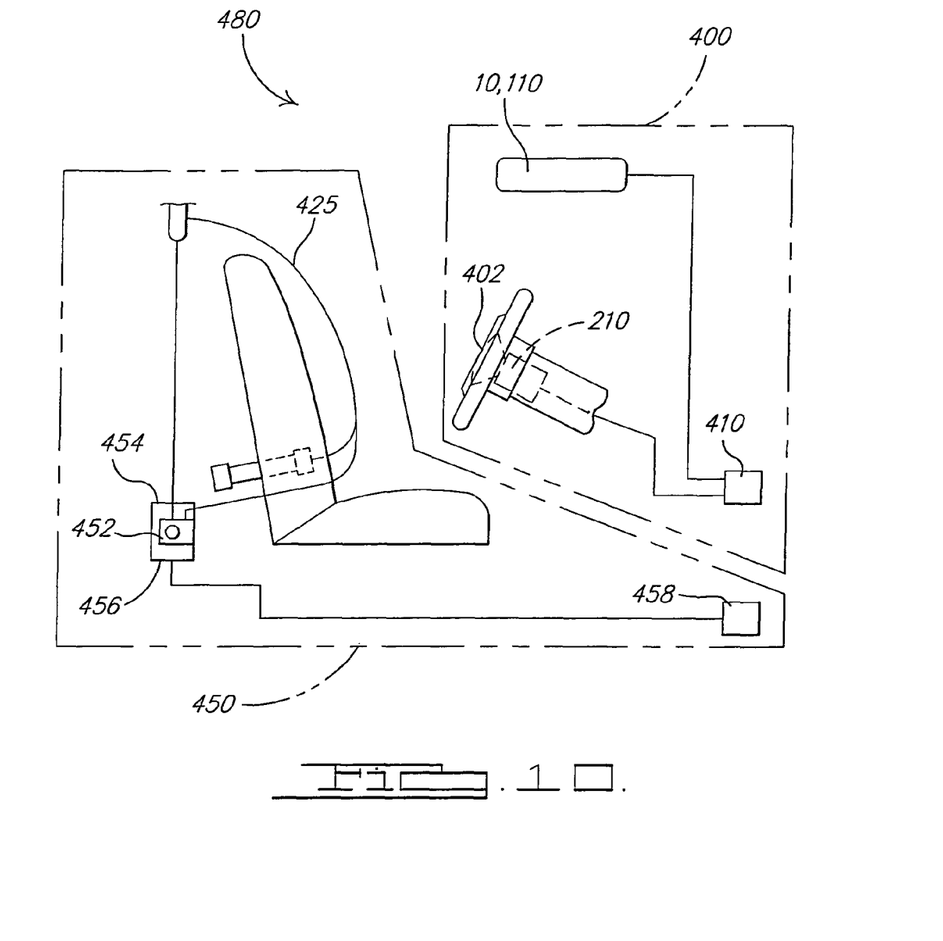
FIG. 10 exemplifies a vehicle occupant protection system in accordance with the present invention.

Referring to FIG. 10, in a particular application, one or more embodiments of the gas generating system described above is incorporated into an airbag system 400 in a passenger vehicle. Airbag system 400 includes at least one airbag 402 and a gas generating system 210 (as shown in FIGS. 8 and 9) coupled to the airbag so as to enable fluid communication with an interior of the airbag upon activation of the gas generating system. Airbag system 400 may also include an additional gas generating system 10, 110 (as shown in FIGS. 1-7) coupled to an associated airbag (not shown) so as to enable fluid communication with an interior of the airbag upon activation of the gas generating system.

Gas generating systems 10, 110, 210 may also be in communication with one or more known crash event sensors 410 in operative communication with a known crash sensor algorithm (not shown) which signals actuation of airbag system 400 via, for example, activation of igniters in the gas generating systems in the event of a collision.

Referring again to FIG. 10, one or more embodiments of the gas generator or an airbag system including an embodiment of the gas generator may be incorporated into a broader, more comprehensive vehicle occupant protection system 480 including additional elements such as a safety belt assembly. Safety belt assembly 450 includes a safety belt housing 452 and a safety belt 425 extending from housing 452. A safety belt retractor mechanism 454 (for example, a spring-loaded mechanism) may be coupled to an end portion of the belt. In addition, a safety belt pretensioner 456 may be coupled to belt retractor mechanism 454 to actuate the retractor mechanism in the event of a collision. Typical seat belt retractor mechanisms which may be used in conjunction with safety belt 400 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 425 may be combined are described in U.S. Pat. Nos. 6,505,790 and 6,419,177, incorporated herein by reference. Safety belt assembly 450 may be in communication with a known crash event sensor 458 (for example, an inertia sensor or an accelerometer) that is in operative communication with a known crash sensor algorithm (not shown) which signals actuation of belt pretensioner 456 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system including a filter assembly comprising:
   a plurality of metallic nodules positioned and secured in a metallic matrix so as to form a porous filtering structure;
   a first baffle plate positioned between the plurality of metallic nodules and a combustible gas generant material of the gas generating system; and
   a second baffle plate positioned between the plurality of metallic nodules and a housing wall of the gas generating system,
   wherein said metallic matrix comprises a flowable metal filler at or above 840 F, but below the melting point of said plurality of nodules.

2. The gas generating system of claim 1 wherein the nodules are substantially spherical.

3. The gas generating system of claim 1 wherein the nodules are hollow.

4. The gas generating system of claim 1 wherein at least a portion of the nodules comprise an aluminum alloy.

5. The gas generating system of claim 1 wherein the filter assembly comprises a metallic foam material.

6. A vehicle occupant protection system including a gas generating system in accordance with claim 1.

* * * * *

UNITED STATES PATENT AND TRADEMARK OFFICE
CERTIFICATE OF CORRECTION

PATENT NO. : 8,608,196 B2
APPLICATION NO. : 11/168267
DATED : December 17, 2013
INVENTOR(S) : Quioc et al.

Page 1 of 1

It is certified that error appears in the above-identified patent and that said Letters Patent is hereby corrected as shown below:

In the Specifications

Column 1; Line 58; delete "and"

Column 4; Line 27; delete "-"

Column 5; Line 27; delete "-"

Column 5; Line 46; delete "by" and insert --bv--

Column 10; Line 30; delete "10°"" and insert --100°--

Column 15; Line 2; delete "thorough" and insert --through--

Column 15; Line 34; delete "othenvise" and insert --otherwise--

Column 15; Line 58, delete "the" after desired

Column 17; Line 18; delete "-"

Column 19; Line 11; delete "-"

Signed and Sealed this
Twenty-fifth Day of March, 2014

Michelle K. Lee
*Deputy Director of the United States Patent and Trademark Office*